(12) United States Patent  (10) Patent No.: US 9,163,770 B2
Kiest, Jr. et al.  (45) Date of Patent: Oct. 20, 2015

(54) METHOD AND APPARATUS FOR LINING A PIPE

(71) Applicants: Larry W. Kiest, Jr., Ottawa, IL (US); Jason M. Mathey, Oglesby, IL (US)

(72) Inventors: Larry W. Kiest, Jr., Ottawa, IL (US); Jason M. Mathey, Oglesby, IL (US)

(73) Assignee: LMK Technologies, LLC, Ottawa, IL (US)

( * ) Notice: Subject to any disclaimer, the term of this patent is extended or adjusted under 35 U.S.C. 154(b) by 47 days.

(21) Appl. No.: 13/826,196

(22) Filed: Mar. 14, 2013

(65) Prior Publication Data

US 2014/0261832 A1  Sep. 18, 2014

(51) Int. Cl.
| | |
|---|---|
| *F16L 55/1645* | (2006.01) |
| *B29C 73/02* | (2006.01) |
| *B29C 35/08* | (2006.01) |
| *B29C 47/00* | (2006.01) |
| *B29C 47/02* | (2006.01) |

(52) U.S. Cl.
CPC ......... F16L 55/16455 (2013.01); B29C 73/025 (2013.01); *B29C 47/0023* (2013.01); *B29C 47/022* (2013.01); *B29C 2035/0827* (2013.01)

(58) Field of Classification Search
CPC ..... F16L 55/163; F16L 55/1651; F16L 55/18; F16L 55/179
USPC ...................................................... 138/97, 98
See application file for complete search history.

(56) References Cited

U.S. PATENT DOCUMENTS

| | | | | |
|---|---|---|---|---|
| 3,103,235 | A * | 9/1963 | Stringham, III | 138/97 |
| 3,269,421 | A * | 8/1966 | Telford et al. | 138/97 |
| 3,618,639 | A * | 11/1971 | Daley et al. | 138/97 |
| 3,834,421 | A * | 9/1974 | Daley | 138/97 |
| 3,834,422 | A * | 9/1974 | Larson | 138/97 |
| 3,894,131 | A * | 7/1975 | Speech | 264/36.11 |
| 4,401,696 | A | 8/1983 | Wood | |
| 5,964,249 | A * | 10/1999 | Kiest, Jr. | 138/98 |
| 6,068,725 | A * | 5/2000 | Tweedie et al. | 156/287 |
| 6,641,688 | B1 * | 11/2003 | Gearhart | 156/95 |
| 6,820,653 | B1 * | 11/2004 | Schempf et al. | 138/98 |
| 6,966,950 | B2 * | 11/2005 | Winiewicz et al. | 118/712 |
| 7,905,255 | B2 * | 3/2011 | Iwasaki-Higbee | 138/98 |
| 2004/0156682 | A1 * | 8/2004 | Blackmore et al. | 405/184.1 |
| 2006/0070676 | A1 * | 4/2006 | Blackmore, Jr. | 138/98 |
| 2010/0243092 | A1 * | 9/2010 | Gillanders et al. | 138/97 |
| 2010/0301505 | A1 | 12/2010 | Kiest, Jr. | |
| 2012/0141210 | A1 | 6/2012 | Kiest, Jr. | |

FOREIGN PATENT DOCUMENTS

WO  9429632  12/1994

OTHER PUBLICATIONS

WO 94/29632, Thaler—English Translation. Dec. 22, 1994.
LMK Technologies, LLC, PCT/US2014/018851 filed Feb. 27, 2014, "The International Search Report and the Written Opinion of the International Searching Authority, or the Declaration", mailed Jun. 17, 2014.

* cited by examiner

*Primary Examiner* — Paul R Durand
*Assistant Examiner* — Vishal Pancholi
(74) *Attorney, Agent, or Firm* — Ryan N. Carter

(57) ABSTRACT

The method for rehabilitating a damaged section of a pipe without a need for a resin absorbent liner is provided. The method includes pumping a low viscosity material towards a damaged section of pipe and changing the viscosity prior to dispensing of the material. For example, the material may be partially cured prior to dispensing. The partially cured or higher viscosity material is compressed between an inflating bladder and interior wall of the pipe, and the material that is allowed to fully cure. The bladder either can then be removed from the pipe or could be allowed to maintain in the pipe providing a new interior surface for the repaired pipe.

19 Claims, 9 Drawing Sheets

METHOD AND APPARATUS FOR LINING A PIPE

FIELD OF THE INVENTION

The present invention relates generally to a method and apparatus for lining a pipe. More particularly, but not exclusively, the invention relates to a method and apparatus for pumping a curable material a long distance, and changing the viscosity of the material prior to dispensing at a final location.

BACKGROUND OF THE INVENTION

A method used for repairing pipelines and other structures includes the use of a liner tube having a felt layer on its inside and having a protective layer made of polymer or other plastic material on its outside. The liner tube is vacuum-impregnated with a resin mix in what is commonly referred to as a "wet-out" process. Just prior to wetting-out the liner, a catalyst is mixed with the resin so as to activate the resin and cause it to begin curing and hardening. The resin impregnated liner tube is then inverted into the pipeline so that the felt layer is inverted from the inside of the tube to the outside. Once the resin cures and hardens, the liner provides a new lining for the pipeline. Some resins are set to cure at ambient temperatures. In some instances, steam or hot water is applied inside the lining tube to speed the cure time One problem with the method is that the catalyst must be mixed with the resin before the liner tube is wet-out and before positioning the liner tube at the damaged section of pipe. Once the catalyst is applied to the resin, the resin begins curing and time is of the essence in order to have the liner tube in place within the pipeline to be repaired. If the resin hardens before the liner tube is properly positioned within the pipe, it may require that a portion of the existing pipeline be dug up and replaced. If, on the other hand, a resin mix with a longer cure time is used to ensure adequate working time to install the liner, productivity suffers as the crew waits for the liner to cure and harden.

Aside from the loss in productivity, there are also additional costs involved in retarding or accelerating the cure time. For example, following the wet-out process the lining tube can be packed in ice and stored in a refrigerated compartment of the truck to retard or prevent the resin from curing. To accelerate the cure time, a large boiler and other equipment is required at the job site. Such equipment and the associated labor required all add to the total installation cost.

Use of a pre-formed liner tube itself can be problematic. For example, the liner tube is normally fabricated off-site in a factory and thus the dimensions of the host pipe and the section of pipe in need of repair must be known in advance to construct a liner of appropriate size. Conventional liners are also susceptible to shrinkage and other structural problems.

Some attempts have been made to spray or sling grout onto the interior surface of the pipe. Such methods are also problematic. Spraying or slinging grout inside the pipe does not provide for a uniform wall thickness of the lining. The grout or other material applied will also tend to run away from the crown of the pipe and toward the bottom of the pipe before the material can cure and harden. This sagging effect results in the uneven distribution of lining material around the interior of the pipe. The lining also does not have a smooth surface. Still further yet, the spraying or slinging method is not effective in areas of the pipe where there is ground water infiltration.

In addition, at times the grout or resin must be pumped a long distance prior to being sprayed or slung on the wall. To be able to pump the material the required distance, the viscosity of the grout or resin material must be low enough to not become clogged or otherwise prevent the movement of the material. However, a material of such a viscosity would sag or fall off of the interior wall of the pipe or structure, as noted above. In addition, most resins or grouts require mixing of two parts to cause the material to begin to cure. Thus, two separate dispensing tubes must be provided so that the two parts of the material do not mix and begin to cure, which would prevent pumping of the material.

Therefore, there is a need in the art for a method and apparatus for pumping a curable material a long distance, which overcomes the need for a pre-formed or resin-absorbent liner, and that also overcomes the problem of the material sagging or not sticking to the wall of the structure.

SUMMARY OF THE INVENTION

It is therefore a primary object, feature, and/or advantage of the present invention to overcome deficiencies in the art.

It is another object, feature, and/or advantage of the present invention to provide a method and apparatus for lining a structure without the use of a resin-absorbent liner.

It is still another object, feature, and/or advantage of the present invention to provide a method and apparatus for pumping a curable material a long distance.

It is yet another object, feature, and/or advantage of the present invention to provide a method and apparatus that provides for changing the viscosity of a curable material during the pumping of the material and prior to dispensing.

It is a further object, feature, and/or advantage of the present invention to provide a method and apparatus for partially curing a curable material while pumping the material to a final destination.

It is yet a further object, feature, and/or advantage of the present invention to provide a method and apparatus for repairing a pipe using a one-part, UV cured resin pumped a long distance.

It is still a further object, feature, and/or advantage of the present invention to provide a method and apparatus that includes a viscosity modifying region in a pumping and dispensing apparatus to partially cure a material during transport.

It is another object, feature, and/or advantage of the present invention to prevent an inflatable bladder from becoming buoyant and controlling a uniform wall thickness.

These and/or other objects, features, and advantages of the present invention will be apparent to those skilled in the art. The present invention is not to be limited to or by these objects, features and advantages. No single embodiment need provide each and every object, feature, or advantage.

According to an aspect of the present invention, a method of rehabilitating a damage section of a pipe that obviates the need for a resin absorbent liner is provided. The method includes positioning a bladder in a pipe. A material capable of curing and hardening is dispensed between an exterior surface of the bladder and the pipe. The material capable of curing and hardening is at least partially cured prior to being dispensed. The at least partially cured material is compressed between the bladder and the pipe, and the material is allowed to continue to cure.

The material capable of curing and hardening can be a one part, UV-cured resin, can be a two-part, mix-cured resin, or can be a water-activated hydrophilic or hydrophobic resin or grout. In any case, the resin begins with a low viscosity such that it can be pumped a long distance. Before dispensing, the resin or grout material is partially cured to raise the viscosity, which provides for better retention at the dispensing point of the material. Therefore, the material can be partially cured by light initiators, by mixing the multiple parts, or by adding water prior to dispensing. The bladder can be prepositioned in the structure and inflated, or can be inverted, with the material dispensed behind an inverting face of the bladder.

According to another aspect of the present invention, a method of rehabilitating a damage section of a pipe that obviates the need for a resin absorbent liner is provided. The method includes positioning a bladder in a pipe; pumping a material capable of curing and hardening and having a first viscosity within the pipe; changing the viscosity of the material being pumped in the pipe; dispensing the material comprising the changed viscosity between an exterior surface of the bladder and the pipe; compressing the material between the bladder and the pipe; and allowing the material to cure.

According to yet another aspect of the present invention, a method of dispensing a material a distance in a delivery apparatus having a starting end and a dispensing end is provided. The method includes, in part, pumping a material capable of changing viscosities through the delivery apparatus. The viscosity of the material is at least partially changed while pumping the material and before the material reaches the dispensing end of the delivery apparatus. The material comprising the at least partially changed viscosity is eventually dispensed out of the dispensing end of the delivery apparatus.

The method can be used for the repair of pipes or other structures, in painting, in medical procedures, or generally any other use that includes drilling, borings, material handling, the transport of a liquid or resin-like material over a relatively long distance. The method allows the material to be dispensed in a changed state after being pumped the distance.

DETAILED DESCRIPTION OF THE PREFERRED EMBODIMENTS

Figure 1:
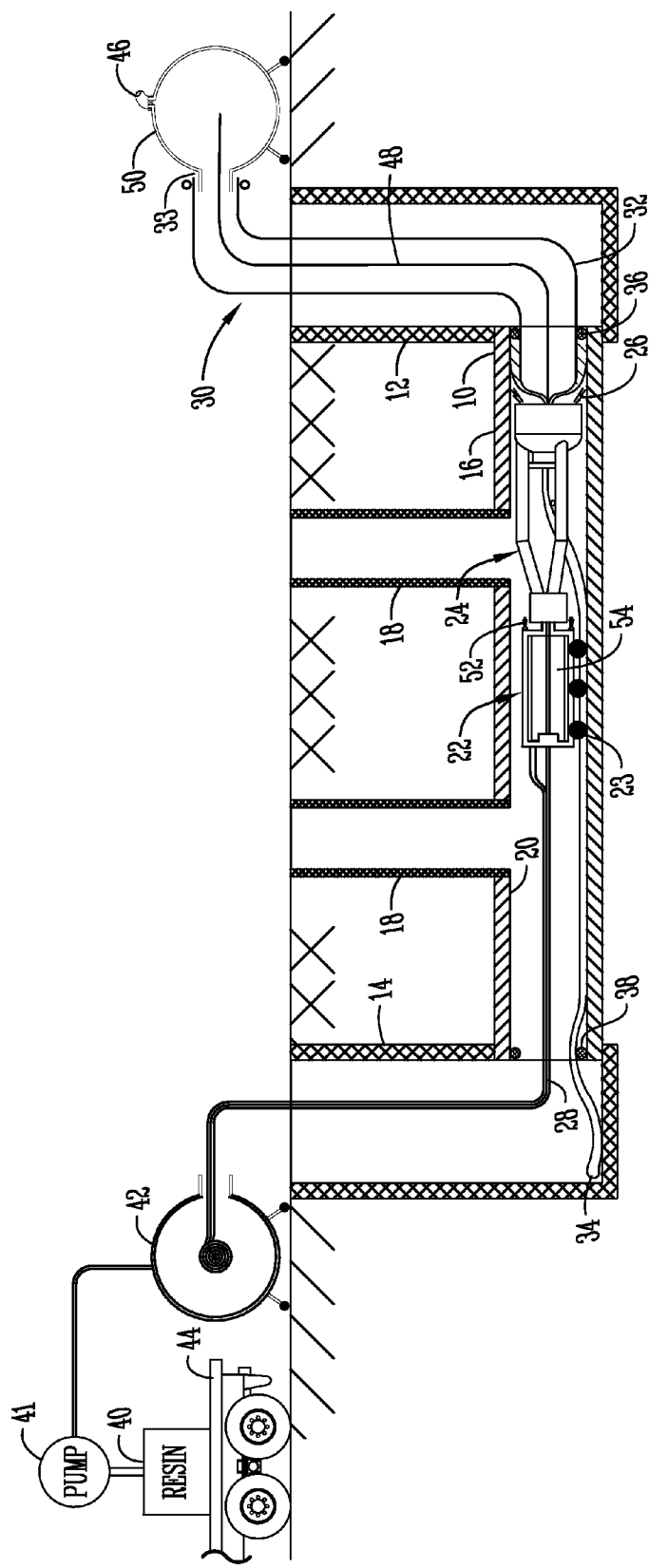
FIG. 1 is a sectional view of a pipe being repaired according to an embodiment of the present invention.

Referring to FIG. 1, a main pipe 10 is shown extending between an upstream manhole 12 and a downstream manhole 14. Lateral pipes 18 extend from the main pipe. The main pipe 10 shown in FIGS. 1 and 2 includes a damaged section 16 in need of repair. While the present invention is shown for use with sewer pipe repair, the present invention can be utilized for repairing other types of pipe, this including but not limiting to gas, water, oil, steam, and compressed air pipes.

Figure 2:
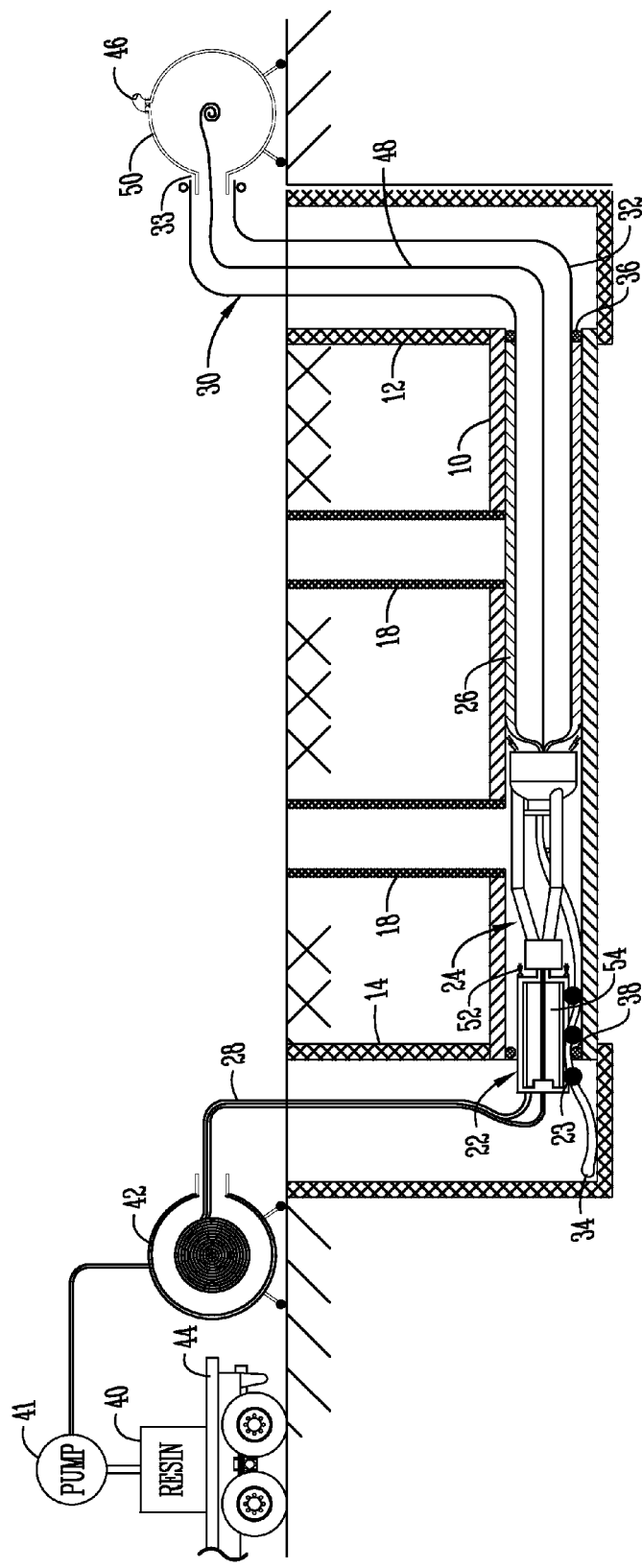
FIG. 2 is a view similar to FIG. 1, showing the repair progressing through the pipe.

To repair the damaged section 16 of the main pipe 10, a tractor 22, an extruder 24, and a bladder 30 are inserted within the pipe 10. The tractor 22 includes a plurality of wheels 23 for movement of the tractor 22 about the interior 20 of the main pipe 10. The extruder or dispensing apparatus 24 is attached to an end of the tractor 22. The bladder 30, as shown in FIGS. 1 and 2, may be positioned through or adjacent a portion of the extruder 24 and tractor 22 such that a sufficient length of bladder 30 is positioned within the pipe 10 to allow the bladder 30 to expand, such as by inflation, to allow the bladder 30 to be expanded about the full periphery of the damaged section 16 of the main pipe 10.

The tractor 22 and extruder 24 are connected to one another, and also to a resin hose 28. The resin hose 28 is connected to a resin reel 42, and is used to transport a resinous material 26 that is pumped via pump 41 from a resin source 40. The pump 41 and resin source 40 may be located on a truck 44 positioned outside of the pipe system. The pump 41 is used to pump resin 26 from the source 40 through the resin line 28 into, through, and out of the extruder 24.

As discussed above, the bladder 30 is positioned in the pipe 10, including adjacent to or through the tractor 22 and extruder 24. Shown in FIG. 1, the bladder 30 may be positioned through the extruder 24 but not the tractor 22, or may be positioned adjacent both or through both. Positioned generally at each end of the main pipe 10 are first and second gaskets 36, 38. The gaskets 36, 38 may comprise a NSF/ANSI 61 material, which may be a hydrophilic material. The first and second gaskets 36, 38 will aid in sealing the ends of the main pipe 10 such that any dispensed material will not go outside the area in need of repair. The bladder 30 includes an open end 33 attached to a bladder roller 50 including an inflation source 46, and an opposite closed end 34 positioned at the opposite end of the pipe in need of repair. A rope 48 may be extended through the bladder 30 and connected to the closed end 34 to aid in removal of the bladder 30 from the pipe in certain embodiments.

The resinous material 26 being pumped through the resin line 28, tractor 22, and out the extruder or dispensing apparatus 24 may be a one part, ultraviolet (UV) cured resin. Other photo curing resins may also be used. The resin material 26 may have a low viscosity while being stored in the reservoir 40 and also while being pumped through the resin line 28. However, the viscosity of the resin material 26 may be increased to a higher viscosity prior to being dispensed at the extruder 24. Therefore, the tractor 22 may include a light tunnel 34 therein. The light tunnel 54, as will be discussed below, will include light initiators 56 for at least partially activating and curing the UV-cured resin 26 as it is pumped through the tractor 22. The light tunnel 54 of the tractor 22 will increase the viscosity of the resin material 26 prior to being dispensed via the extruder 24. As in known in the art, it is advantageous to have a higher viscosity material being pumped in a manner similar to that shown in FIG. 1 via the extruder 24 in between an exterior surface 32 of the bladder 30 and the interior 20 of the pipe 10 such that the resin material 26 will not be able to drip or migrate from the periphery of the interior 20 of the pipe 10. The higher viscosity will allow the dispensed resin to maintain its position at the interior 20 at the pipe 10, and prevent the inflated bladder from floating. In addition, fillers, such as carbon nanotubes or other like materials, may be incorporated into the resin.

Therefore, as shown in FIGS. 1 and 2, the resin material 26 having a low viscosity will be pumped through the resin line 28 from the reservoir 40 towards the tractor 22. The light tunnel 54 of the tractor 22 will begin to at least partially cure the material 26, thus increasing viscosity of the material as it is moved through the tractor 22. The material continues through the extruder 24, beginning in the extruder entrance 58 and exiting at the extruder exit 60, and is dispensed between an exterior surface 32 of the bladder 30 and the interior 20 of the pipe 10. As the bladder 30 is being inflated through the pipe 10 as the tractor 22 and extruder 24 are moved through the pipe, the bladder 30 will press the dispensed material against a wall of the pipe 10, where it is allowed to further cure and harden.

Other components shown in FIGS. 1 and 2 that may be included with embodiments of the present invention include one or more cameras 52 positioned on or at the tractor 22. The cameras 52, which are connected to an area external of the pipes via a camera line 53, will aid in viewing the interior of the pipe 10, including the dispensement of the resin material 26 between the bladder 30 and the pipe 10. This will aid in moving the tractor 22 through the pipe 10. The tractor 22 may be moved in the pipe 10 by pulling or rolling the resin line 28 via the variable speed controlled resin hose reel 42. Thus, the speed of the resin hose reel 42 may be adjusted as needed according to what is shown by the cameras 52 and the pipe 10. However, it should be appreciated that not all embodiments require a camera or cameras within the pipe, and the speed of travel by the tractor 22 in the pipe 10 may be preset such that it is automatic through the pipe based on prior knowledge of the dispensing rate of the resin material 26 by the extruder 24. In addition, other sensors besides cameras may be used.

As discussed, the bladder 30 may be connected to a bladder roller 50 at an open end 33 of the bladder 30. The bladder roller 50 may include an inflation source 46, such as an air source, for inflating the bladder as the repair assembly (tractor, extruder, etc.) moves through the pipe 10. The inflation source 46 will provide air or another fluid to the interior of the bladder 30 such that the inflating edge of the bladder will remain close to the dispensing head or extruder exit 60 such that the bladder 30 will press the resin material 26 between the exterior 32 of the bladder 30 and the interior 20 of the pipe 10 as it is being dispensed. The present invention contemplates that the resin material 26 may be dispensed either in front of or behind the inflating edge of the bladder 30. It is also contemplated that, instead of the tractor 22 moving due to the resin hose reel 42, the inflation of the bladder 30 may also press against the extruder exit 60 end of the extruder 24 such that the continued inflation of the bladder 30 will move the tractor 22 and extruder 24 through the pipe 10. The extruder 24 may also include a plate (not shown) or other device for resting adjacent the inflating portion of the bladder 30. In addition, a rope 48 may be connected to the reel 50 and closed end 34 of the bladder 30 such that the rope may be pulled or reeled once the resinous material has cured to remove the bladder 30 from the interior of the pipe 10. The resin hose itself could also be pulled to move the components through the pipe. This would negate the need for the use of the tractor. However, it is also contemplated in other embodiments that the bladder may remain within the pipe 10 when permanently bonded to the curable material.

While FIGS. 1 and 2 show the bladder 30 and resin material 26 blocking the lateral pipes 18 extending from the main pipe 10, it should be appreciated that the present invention contemplates that the lateral pipes 18 may be reinstated once the resin material 26 has cured, thus reinstating access to the main pipe 10 via the lateral pipes 18. The lateral pipes 18 may be reinstated as is known the art, such as by cutting the resin material and/or bladder material at the opening of the lateral pipes 18.

Figure 3:
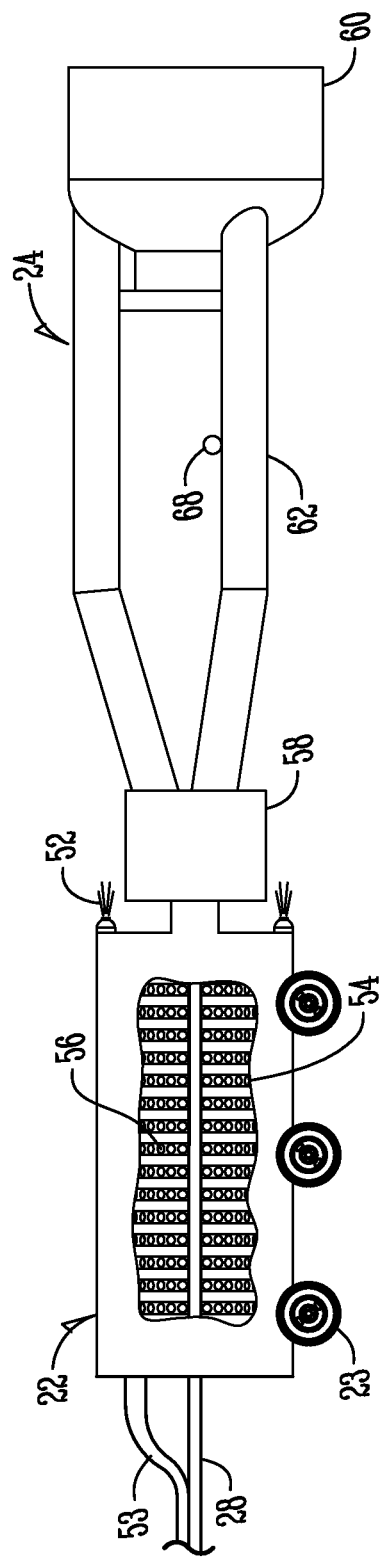
FIG. 3 is an elevation and partial sectional view of a tractor and extruder used in the pipe repair according to an embodiment of the present invention.

FIG. 3 is a side elevation and partial sectional view of a tractor 22 and extruder 24 that may be used for the pipe repair according to embodiments of the present invention. As discussed, a resin line 28 is configured to pump the resin material 26 from the reservoir 40 to the extruder 24. As shown in FIG. 3, the resin line 28 may pass through the tractor 22 and into the extruder entrance 58 of the extruder 24. As shown by the sectional view of the tractor 22, the interior of the tractor 22 includes a light tunnel 54 comprising a plurality of light initiators 56. As discussed above, the resin material 26 may be one part, UV-cured resin having an initial low viscosity. A low viscosity may be in the range of approximately 500 centipoise (cP), while a high viscosity may be approximately 50,000-100,000 cP. The low viscosity of the resin will allow the resin to be pumped easily over long distances. However, it may be desired to dispense a resin having a higher viscosity within the pipe 10. The light tunnel 54 comprising the plurality of light initiators 56 comprise UV light sources such that the resin material 26 passing through the transparent resin line 28 through the tractor 22 will be initiated by the light initiators 56 to begin curing. This curing will raise the viscosity of the resin as it moves through the tractor 22 and into the extruder 24. Thus, the resin being dispensed by the extruder 24 will have a higher viscosity that will maintain its position at the interior 20 of the pipe 10. Thus, there will be less chance of the resin material 26 running from the crown of pipe or the pipe and/or sagging. Furthermore, the higher viscosity material will mitigate floating of the bladder. With low viscosity, the bladder can move relative to the material. However, as the material has a higher viscosity, the thickness of the material will reduce the likelihood of the bladder floating.

Figure 4:
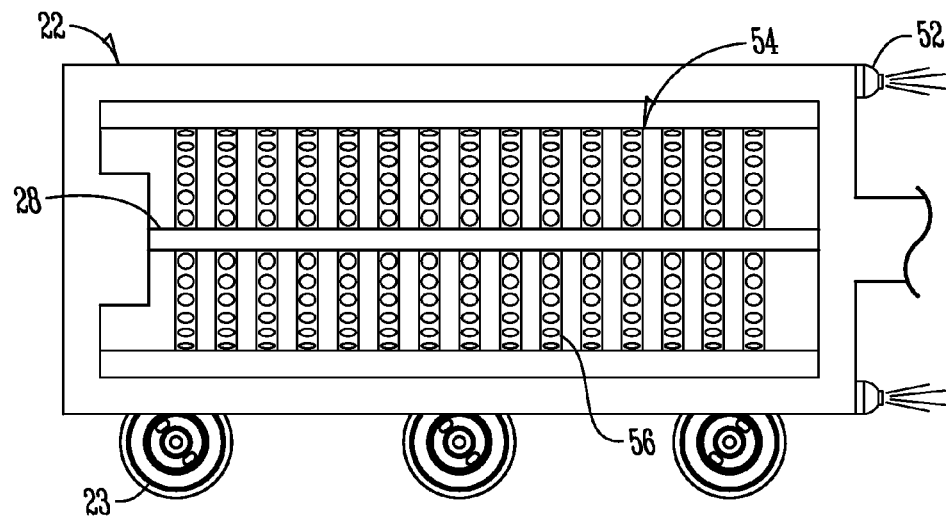
FIG. 4 is a sectional view of the tractor of FIG. 3.

FIG. 4 shows a sectional view of the tractor 22 according to an embodiment of the invention. As discussed, the tractor 22 includes a light tunnel 54 comprising a plurality of light initiators 56. The light initiators 56 may comprise a ring of UV producing lights. Furthermore, as shown in FIG. 4, the light tunnel 54 may comprise a plurality of the rings of UV lights. In addition, LED lights or any other type of lights may be used. The resin passing through the resin line 28 within the tractor 22 will thus be activated by the UV lights of the light initiator 56 to begin curing, thus raising the viscosity of the material. In addition, as the tractor 22 may include cameras 52 positioned at the front end of the tractor 22, the cameras 52 may be able to view the viscosity of the resinous material 26 being dispensed from the extruder 24. If the viscosity of the resinous material is too high, the light or some of the lights of the light tunnel 54 may be decreased in intensity or turned off to stop the curing of the material through the tractor 22 all dependent on the flow rate of the material. In the alternative, if the viscosity of the resinous material 26 being dispensed is too low, the intensity of some or all of the lights of the light tunnel 54 may be increased or turned on to increase the activation and curing of the resinous material through the light tunnel 54 of the tractor 22. Thus, the control of the viscosity of the resinous material 26 being dispensed by the extruder 24 can be adjusted on the fly from an external location of the pipe 10. Furthermore, the curing can be halted completely by turning off the UV lights.

It should be noted that the process can be computer controlled, with the intensity of the light being controlled by the flow rate of the material being pumped. For example, to move through the pipe at 10 feet/minute and having a pipe length of 500 feet, the install time would be 50 minutes. For an 8-inch pipe versus an 18-inch pipe, much more material will need to be pumped for the 18-inch pipe, and therefore, the light intensity will need to be increased.

While a one part, UV-cured resin, along with light initiators 56 has been disclosed for changing the viscosity of the resinous material 26 from a generally low viscosity to a higher viscosity during pumping and dispensing of the material, it should be appreciated that other manners of changing the viscosity may be included as part of the present invention. For example, if a thermoset resin is utilized with the present invention, the tractor 22 may include a heat source and a heat tunnel therein. The resinous material 26 may be pumped from the reservoir 40 at a low viscosity over a long distance and towards the tractor 22. While passing through the tractor 22, the material may be passed via a heat source, such as heat lamps, electrical coils, or the like, to begin activation and at least partial curing of the material 26. This activation will raise the viscosity of the material as it moves through the tractor and towards the extruder or dispensing apparatus 24. Other one part activating resin materials may be activated accordingly as they are passed through or adjacent the tractor 22 in a similar manner.

Figure 5:
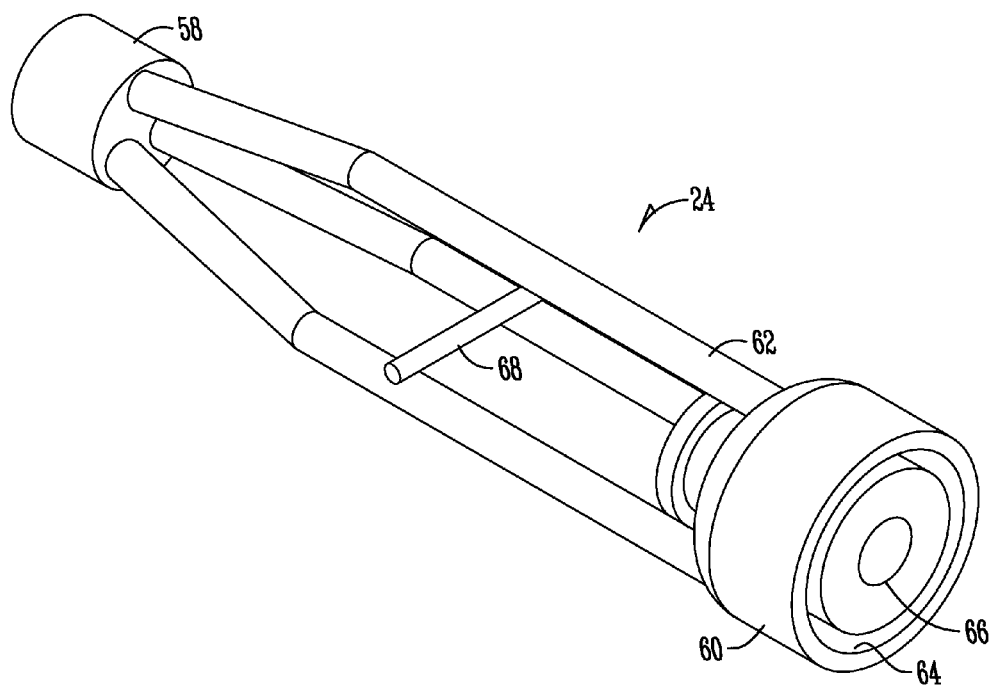
FIG. 5 is a perspective view of the extruder of FIG. 3.

FIG. 5 is a perspective view of an example of an extruder head or dispensing apparatus 24 for use with the present invention. The extruder 24 includes an entrance end 58 and an opposite exit 60. The entrance 58 is generally connected to the tractor 22 and in communication with the resin line 28 for receiving the partially cured resinous material 26 having a higher viscosity. One or more extruding tubes 62 connect the entrance 58 and exit 60 of the extruder 24. As shown in FIG. 5, three extruder tubes 62 are radially positioned between the entrance 58 and exit 60. The radial positioning of the tube 62 will divert amounts of resinous material 26 such that the resinous material 26 will be dispensed at a generally equal amount radially around the extruder aperture 64 at the extruder exit 60. Thus, the positioning of the tubes will aid in providing that the resinous material 26 extruded generally around the full interior 20 of the pipe 10 as the tractor 22 and extruder 24 are moved through the pipe 10. While the extruder exit 60 and extruder aperture 64 are shown to be generally circular, it should be contemplated that any shape may be used, such as according to the shape of the pipe or location being repaired. In addition, the number and orientation of extruder tube(s) 62 may also be varied as needed.

Also shown in FIG. 5 is an extruder bladder aperture 66 and a bridge 68 positioned between two of the tubes 62. As mentioned above, the bladder 30 may be positioned in the pipe 10 prior to being inflated therein. To ensure that the bladder 30 is out of the way during dispensing of the resinous material by the extruder 24, the bladder 30 may be run through the aperture 66 in the extruder exit 60 and may be positioned on either side of the bridge 68. The positioning of the bladder 30 in this manner will allow the bladder to remain out of the dispensing direction of the extruder 24, as well as out of the way of the moving tractor 22/extruder 24 through the pipe 10. Furthermore, it is contemplated that the bladder may also be strung through the tractor 22, or it may be positioned generally adjacent the tractor between the tractor 22 and the pipe 10.

Still further, it is contemplated that the bladder 30 may be inverted through the pipe 10 instead of being prepositioned within the pipe 10. In such embodiments, the bladder 30 will have an inverting face that is positioned generally adjacent the exit 60 of the extruder 24 such that the inverting bladder face will continue expanding at the extruder exit 60 as the extruder 24 and tractor 22 are moved through the pipe 10.

The invention provides numerous advantages over prior methods of pipe repair. For example, the use of a single component, UV-cured resin requires only one hose 28 and one pump 41 and no static mixing chamber. As the UV-cured resin cures rather quickly, the viscosity of the resin may be changed just prior to dispensing of the resin such that a low viscosity resin may be pumped over the long distance between the reservoir 40 and the dispensing area within the pipe 10, e.g. 500-800 feet. Furthermore, the curing of the one part resin can be controlled as the lights of the light tunnel may be turned on and off quickly to begin or halt curing of the resin. Furthermore, the intensity of the light within the light tunnel may be adjusted to affect the curing rate of the resin as it passes through the tunnel.

The resin line 28 may be opaque between the reservoir 40 and the tractor 22, and may be translucent or transparent within the tractor to allow the UV emitting light initiators 56 to begin curing the resin therein.

It should be appreciated that the ability to transport a low viscosity resin over long distance is beneficial in the art as less energy will be required via the pump to move the resin from the reservoir 40 to the dispensing area. However, it should also be appreciated that the changing of the viscosity of the resin from the low viscosity to a high viscosity just prior to dispensing of the resin will still allow the resin to not sag or move at the point of dispensement between the bladder 30 and the pipe 10.

As discussed above, once the resin material 26 is dispensed in the pipe 10, the bladder 30 is continued to inflate to press the resin between the bladder 30 and the pipe 10. The inflation is maintained until the resin has fully cured, thus repairing the wall or a portion of the wall of the pipe 10. After the resin has cured, the bladder 30 may be removed from the pipe 10 by pulling the rope 48 connected to the closed end 34 of the bladder 30. In other embodiments, however, it may be desired to leave the bladder 30 in the pipe 10 after the resinous material 26 has cured.

Figure 6:
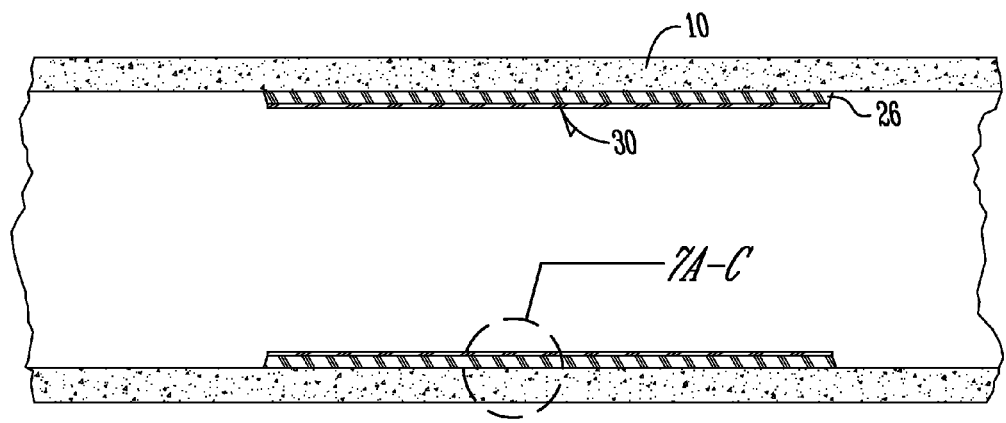
FIG. 6 is a sectional view of a sewer pipe with a damaged section of pipe lined according to an alternative embodiment of the present invention.

FIG. 6 shows an embodiment of the bladder 30 remaining in the pipe 10 after the resinous material 26 has cured. The curing of the resinous material 26 may create a chemical bond between the material 26 and the exterior of the bladder 30 such that the bladder 30 will remain attached to the resinous material 26. The smooth interior surface of the bladder 30 will provide a smooth surface for the repaired pipe 10.

Figure 7A:
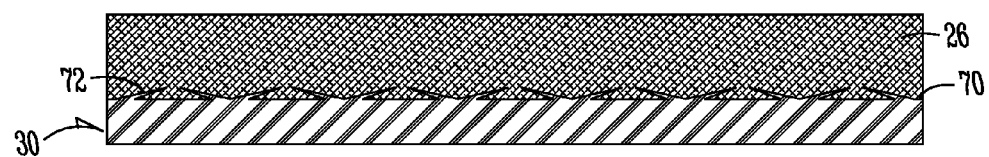
FIGS. 7A-7C are enlarged sectional views, illustrating various forms of a bladder for use in an alternative embodiment of the present invention.
Figure 7B:
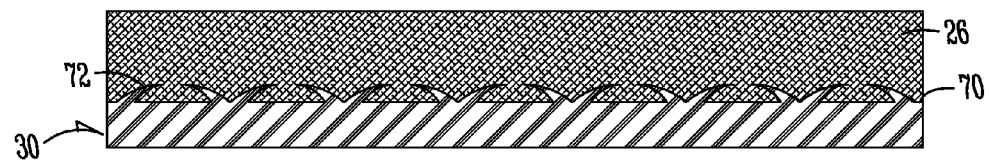
Figure 7C:
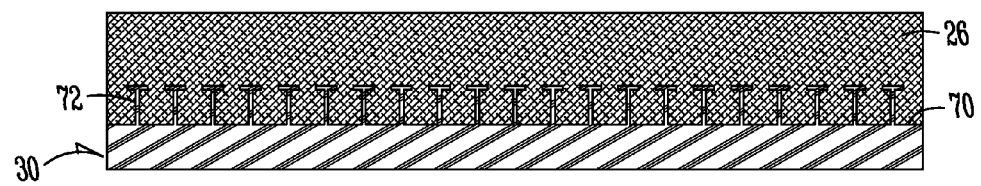

FIGS. 7A-7C show another embodiment where the bladder 30 is remained within the pipe 10. FIGS. 7A-7C show a mechanical connection between the resinous material 26 and the bladder 30. The Figures show the exterior surface 32 of the bladder 30 having an uneven surface 70 and including hook-like projections 72 extending therefrom. The hook-like projections 72 will form a mechanical bond or connection between the bladder 30 and the resinous material 26, such that the bladder 30 will remain connected or affixed to the resinous material 26. FIGS. 7A-7C show various configurations of the hook-like projections 72 of the uneven exterior surface 70 of the bladder 30. However, it should be appreciated that other forms of projections 72 may be provided at the uneven exterior 70 of the bladder 30 to create a mechanical bond between the bladder 30 and the resinous material 26.

Figure 8:
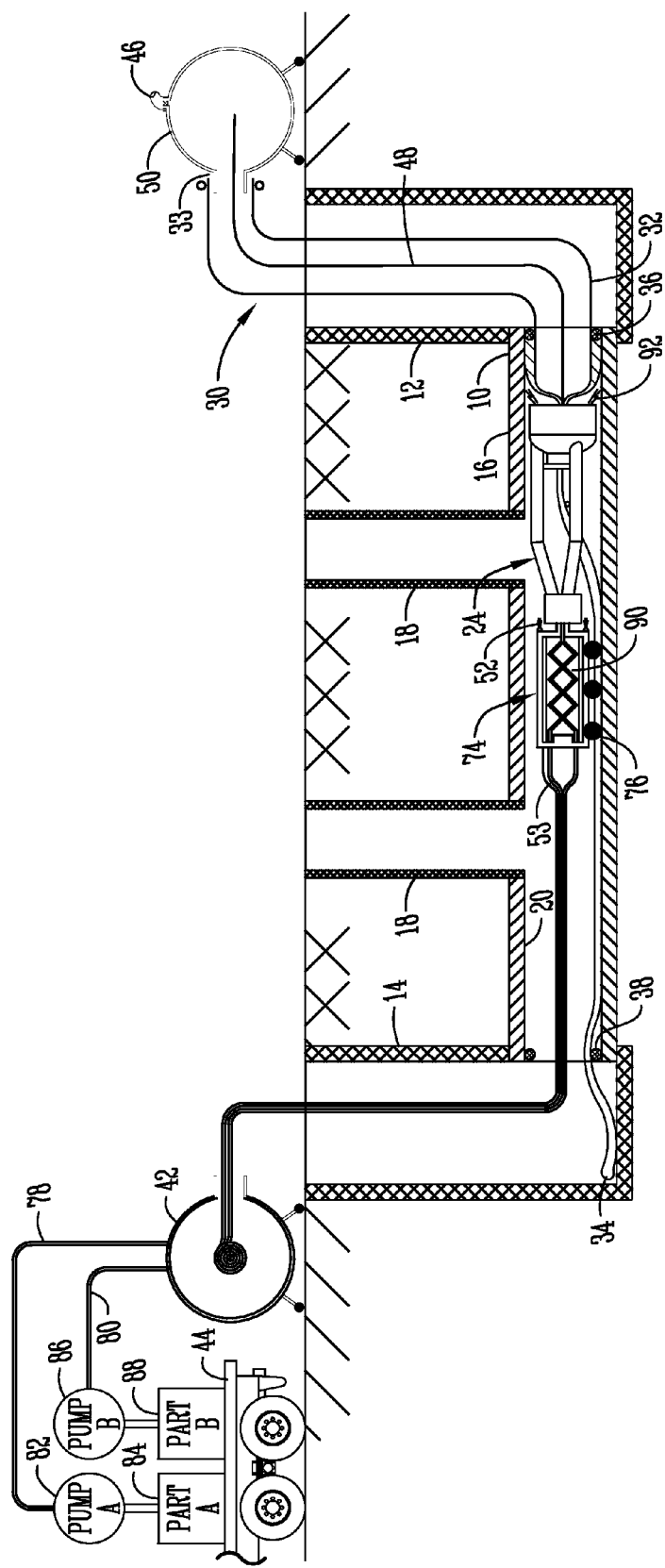
FIG. 8 is a sectional view of a pipe being repaired according to another embodiment of the present invention.
Figure 9:
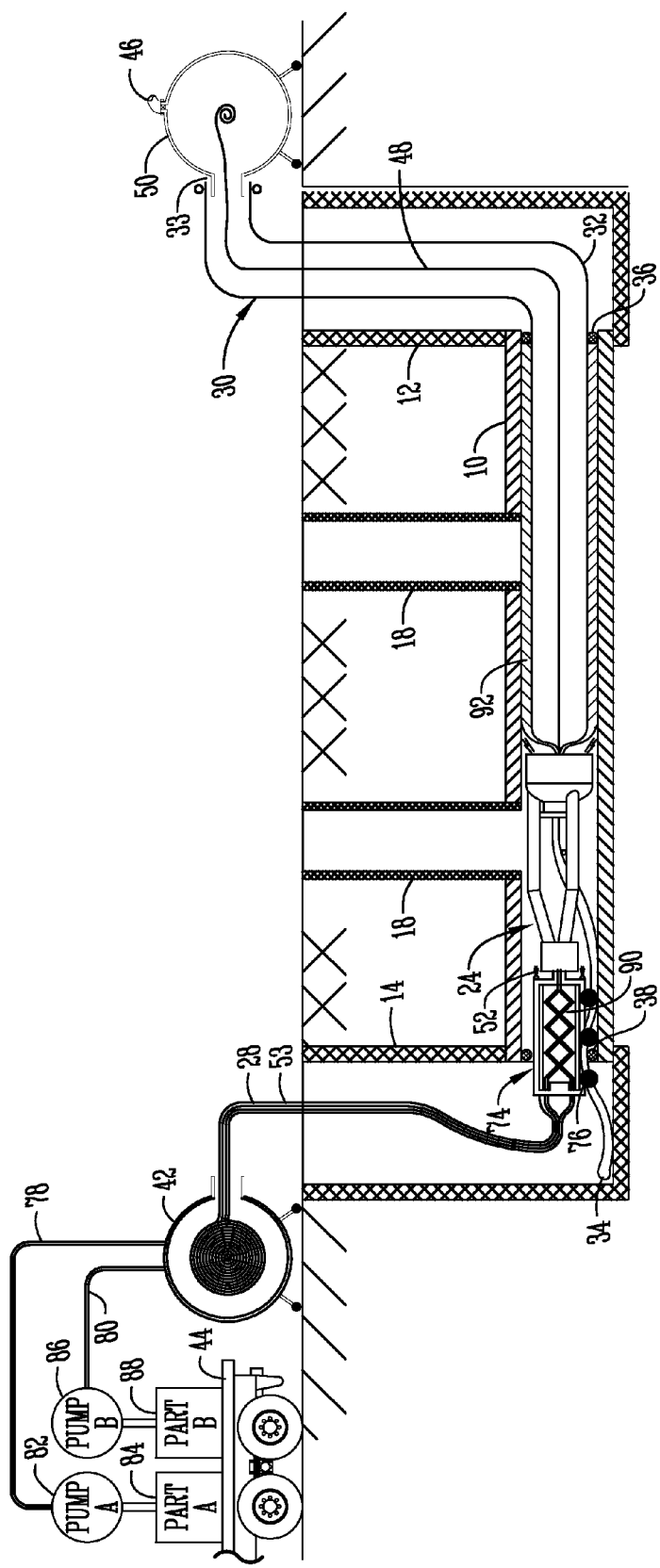
FIG. 9 is a view similar to FIG. 8, showing the repair progressing through the pipe.

FIGS. 8 and 9 provide additional embodiments of the method of pipe repair according to the present invention. FIGS. 8 and 9 provide another method for pumping low viscosity resins over a long distance and changing the viscosity prior to dispensing the resin to repair a pipe 10. However, in FIGS. 8 and 9, a two-part resin is shown. The embodiments shown in FIGS. 8 and 9 include a first reservoir 82 having a first part of a resinous material, and a second reservoir 86 having a second part of a resin material 92. The two parts are pumped via first and second pumps 84, 88 through first and second hoses 78, 80, and towards a tractor 74 positioned within a pipe 10. In the embodiments shown in FIGS. 8 and 9, the tractor 74 includes a mixing chamber 90 therein to allow the first and second parts of the resinous material 92 to mix. When practicing this method one would need to know the gel time for the mixed resin and relate that the speed the tractor moves through the pipe. It should also be noted that a two part material that has a long pot time and requires heat to cure could be mixed together and pumped through a single hose and activated at the tractor as described to change viscosity.

As the first and second parts of the resinous material 92 combine, they will begin to cure. The initial curing of the materials will increase the viscosity of the components of the resin in the mixing chamber 90 such that a higher viscosity will be dispensed by the extruder 24. Therefore, an extruder 24 as was shown and described previously may also be used for these embodiments. However, similar to the previous embodiments, the bladder 30 may be prepositioned within the pipe 10 and through the extruder 24, or may be inverted through the pipe as the tractor 74 and extruder are moved in the pipe. Furthermore, the bladder 30 may be removed from the pipe after the resinous material 92 has cured, or it may be left in the pipe to provide a smooth interior surface after the resinous material 92 has cured. In addition, the tractor 74 also includes wheels 76 for aiding in the movement, cameras 52 for providing a view within the pipe 10 as the pipe is being repaired, and camera line 53 for connecting the cameras to an area external of the pipe 10.

It should be appreciated that the embodiments shown in FIGS. 8 and 9 provide another method of repairing the pipe that allows for a low viscosity resin to initially be pumped from the reservoir and towards a tractor and dispenser. The low viscosity of the resin being moved from the reservoir towards the tractor and dispenser will allowed the resin to be moved over long distances without requiring a great amount of energy or pumping force, while also allowing for the use of a smaller diameter hose. However, the embodiments also provide for increasing the viscosity of the resinous material prior to dispensing the material such that the higher viscosity material being dispensed will not sag or run about the walls of the pipe 10. Instead of using a one-part cured material, the embodiments shown in FIGS. 8 and 9 include multiple part resins. It should also be appreciated that the tractor may include other controls for controlling the rate of mixture between the first and second parts of the resinous material 92 to control the change in viscosity of the material from a low viscosity to a high viscosity.

The present invention relates to a technology that allows a low viscosity material to be moved a long distance in a pipe or other member being repaired or needing the material, while allowing for the viscosity of the material to be raised prior to dispensing of the material. Thus, while the invention has been shown and described relating to pipe repair, it should appreciated that other fields may benefit from the invention. For example, the health industry may benefit from pumping a low viscosity material through a tube or conduit, such as into a body or via blood vessels. The viscosity could be changed at a specified location by the inclusion of light initiators, such as UV lights, to increase the viscosity of the material being pumped prior to dispensement. Other uses are also envisioned. For example, the present invention contemplates moving any types of liquid-like material a relatively long distance; wherein the viscosity of the material may be changed prior to the final location of the material. The inclusion of a UV-cured resin that can be activated via light initiators at a desired location may benefit many fields as can be appreciated by those in the art. The present invention allows for the material to be moved relatively long distance with a lower concern that the material will clog in the pipe and will not reach the distance, while still insuring that the material will have a higher viscosity at the point of dispensement.

The invention has been shown and described above with reference to embodiments, and is understood that modifications, substitutions, and additions may be made which are within the intended spirit and scope of the invention. For example, while the invention has been described as moving through the pipe by the resin hose pulling the tractor or the bladder having an inverting face for pushing the dispenser and tractor, it should be appreciated that other means and manners of moving the tractor and dispenser through the pipe are envisioned, which may include a combination of pulling and pushing the tractor via the bladder and/or hose. Furthermore, other types of dispensing heads, such as spinning heads or slinging heads may be used as for dispensing of the material within the pipe or other apparatus. The invention is only to be limited by claims appended hereto.

What is claimed is:

1. A method of rehabilitating a damaged section of a pipe that obviates the need for a resin absorbent liner, comprising:
   positioning a bladder in a pipe;
   dispensing a material capable of curing and hardening between an exterior surface of the bladder and the interior surface of the pipe;
   wherein the material capable of curing and hardening is at least partially cured prior to being dispensed;
   compressing the at least partially cured material between the bladder and the pipe; and
   allowing the material to continue to cure;
   wherein the material capable of curing and hardening is a one-part, UV cured resin;
   pumping the UV-cured resin through a light tunnel to at least partially cure the resin prior to dispensing.

2. The method of claim 1 further comprising removing the bladder from the pipe after the material has cured.

3. The method of claim 1 wherein the step of at least partially curing the resin increases the viscosity of the pumped resin.

4. The method of claim 1 further comprising inflating the bladder in the pipe to compress the material between the bladder and the pipe.

5. The method of claim 4 wherein the step of positioning the bladder in the pipe comprises inverting the bladder through the pipe.

6. The method of claim 5 wherein the material is dispensed rearward of the inverting face of the bladder between an exterior surface of the bladder and the damaged section of pipe.

7. The method of claim 6 wherein the material is pumped from ahead of the inverting face of the bladder and toward the inverting face of the bladder.

8. A method of rehabilitating a damaged section of a pipe that obviates the need for a resin absorbent liner, comprising:
   positioning a bladder in a pipe;
   pumping a material capable of curing and hardening, and having a first viscosity within the pipe;
   changing the viscosity of the material being pumped in the pipe;
   dispensing the material comprising the changed viscosity between an exterior surface of the bladder and the pipe;
   compressing the material between the bladder and the pipe; and
   allowing the material to cure;
   wherein the change in viscosity comprises raising the viscosity of the material;
   wherein the material is a one-part, UV-cured resin;
   wherein the step of changing the viscosity of the material comprises pumping the resin at least partially through a UV light source.

9. The method of claim 8 wherein the material is a two-part resin.

10. The method of claim 9 wherein the step of changing the viscosity of the material comprises mixing the two parts of the resin just prior to dispensing the resin.

11. The method of claim 8 further comprising removing the bladder from the pipe.

12. The method of claim 8 wherein the bladder remains in the pipe after the material has cured and hardened.

13. A method of dispensing a material a distance in a delivery apparatus having a starting end and a dispensing end, comprising:
- pumping a material capable of changing viscosities through the delivery apparatus;
- at least partially increasing the viscosity of the material while pumping the material and near the dispensing end of the delivery apparatus;
- wherein the increase in viscosity is controlled; and
- dispensing the material comprising the at least partially changed viscosity out of the dispensing end of the delivery apparatus;
- wherein the material is a UV-cured material, and the step of at least partially changing the viscosity comprises pumping the material adjacent a light source.

14. The method of claim 13 wherein the light source comprises a light tunnel including a plurality of light initiators.

15. A method of rehabilitating a section of a pipeline, comprising:
- pumping a material capable of curing through a delivery hose, said material having a viscosity of less than 10,000 cP;
- using light or heat to change the viscosity of the material to 10,000 cP or greater; and
- applying the material comprising the changed viscosity to the interior of the pipeline.

16. A method of rehabilitating a damaged section of a pipe that obviates the need for a resin absorbent liner, comprising:
- dispensing a one-part material capable of curing and hardening to the interior surface of the pipe;
- wherein the material capable of curing and hardening is at least partially cured prior to being dispensed; and
- allowing the material to continue to cure.

17. A method of rehabilitating a damaged section of a pipe that obviates the need for a resin absorbent liner, comprising:
- positioning a bladder in a pipe;
- pumping a one-part material capable of changing viscosities through a delivery apparatus having a dispensing end;
- at least partially increasing the viscosity of the one-part material while pumping the material and near the dispensing end of the delivery apparatus; and
- dispensing the one-part material comprising the at least partially changed viscosity out of the dispensing end of the delivery apparatus and between an exterior surface of the bladder and an interior surface of the pipe.

18. The method of claim 17 wherein the viscosity is increased using light.

19. The method of claim 17 wherein the viscosity is increased using heat.

* * * * *